United States Patent
Reese et al.

(10) Patent No.: US 9,288,514 B2
(45) Date of Patent: *Mar. 15, 2016

(54) METHOD AND APPARATUS FOR HIGH SPEED DATA SERVICES

(75) Inventors: Kevin Reese, Fayetteville, GA (US); Alfonso Jones, Suwanee, GA (US); Steven McDonald, Locust Grove, GA (US)

(73) Assignee: AT&T INTELLECTUAL PROPERTY I, LP, Atlanta, GA (US)

(*) Notice: Subject to any disclaimer, the term of this patent is extended or adjusted under 35 U.S.C. 154(b) by 294 days.

This patent is subject to a terminal disclaimer.

(21) Appl. No.: 13/557,355

(22) Filed: Jul. 25, 2012

(65) Prior Publication Data

US 2012/0297439 A1 Nov. 22, 2012

Related U.S. Application Data

(63) Continuation of application No. 12/545,428, filed on Aug. 21, 2009, now Pat. No. 8,255,967.

(51) Int. Cl.
*H04N 7/173* (2011.01)
*H04N 21/2381* (2011.01)
*H04N 7/10* (2006.01)
*H04N 21/61* (2011.01)

(52) U.S. Cl.
CPC ........... *H04N 21/2381* (2013.01); *H04N 7/108* (2013.01); *H04N 21/6118* (2013.01)

(58) Field of Classification Search
CPC ........................ H04N 21/2381; H04N 21/6118
See application file for complete search history.

(56) References Cited

U.S. PATENT DOCUMENTS

| | | | |
|---|---|---|---|
| 5,210,523 A * | 5/1993 | Tipping | 340/540 |
| 6,563,864 B1 * | 5/2003 | Ibrahim et al. | 375/222 |
| 6,804,267 B1 | 10/2004 | Long | |
| 7,023,963 B1 | 4/2006 | Chu | |
| 7,072,411 B1 | 7/2006 | Dollard | |
| 2002/0001307 A1* | 1/2002 | Nguyen et al. | 370/386 |
| 2002/0041657 A1 | 4/2002 | Ulanskas | |
| 2003/0066082 A1* | 4/2003 | Kliger et al. | 725/80 |

(Continued)

OTHER PUBLICATIONS

ITU-T; International Telecommunication Union; Telecommunication Standardization Sector of ITU; G.992.3; Asymmetric digital subscriber line transceivers 2 (ADSL2); Jul. 2002.*

(Continued)

*Primary Examiner* — Joshua Taylor
(74) *Attorney, Agent, or Firm* — Guntin & Gust, PLC; Joseph Hrutka

(57) ABSTRACT

A system that incorporates teachings of the present disclosure may include, for example, receiving, by a first line card coupled to minimally twisted or non-twisted pair cables, a very high digital subscriber line signal, modifying the very high digital subscriber line signal for transmission over the minimally twisted or non-twisted pair cables to generate an updated very high digital subscriber line signal that overcomes a transmission deficiency, and transmitting from the first line card the updated very high digital subscriber line signal to a second line card to cause the second line card to receive the adapted very high digital subscriber line signal at a desired signal quality and convert the updated very high digital subscriber line signal to a very high digital subscriber line signal for presentation of interactive television services at the customer premise equipment. Other embodiments are disclosed.

14 Claims, 5 Drawing Sheets

(56) References Cited

U.S. PATENT DOCUMENTS

| | | | |
|---|---|---|---|
| 2004/0006769 A1* | 1/2004 | Ansari et al. | ................. 725/74 |
| 2005/0220180 A1 | 10/2005 | Barlev | |
| 2006/0164101 A1 | 7/2006 | Fossion | |
| 2008/0030202 A1 | 2/2008 | Wang | |
| 2008/0146146 A1 | 6/2008 | Binder | |
| 2009/0165039 A1 | 6/2009 | Soo | |
| 2010/0172232 A1 | 7/2010 | Traeber | |
| 2010/0307798 A1* | 12/2010 | Izadian | ..................... 174/255 |
| 2012/0051410 A1* | 3/2012 | Flowers et al. | ............. 375/222 |

OTHER PUBLICATIONS

Werner, "The HDSL Environment", IEEE Journal on Selected Areas in Communications, vol. 9, No. 6, Aug. 1991.

\* cited by examiner

400

(PRIOR ART)

500

600

METHOD AND APPARATUS FOR HIGH SPEED DATA SERVICES

CROSS-REFERENCE TO RELATED APPLICATIONS

This application is a continuation of U.S. patent application Ser. No. 12/545,428 filed Aug. 21, 2009 which is incorporated herein by reference in its entirety.

FIELD OF THE DISCLOSURE

The present disclosure relates generally to high speed data services and more specifically to data services using minimally twisted or non-twisted pair cables.

BACKGROUND

Existing cabling for digital subscriber line (DSL) carriers typically contain a mixture of cable types including twisted, non-twisted, and minimally twisted cables. Due to this variance in cable types, certain services can be offered to customers such as interactive TV (iTV) or Internet Protocol TV (IPTV) over twisted cables while such services are generally unavailable over non-twisted and minimally twisted cables due to certain constraints mainly dealing with sufficient signal quality and signal speed or bandwidth. Many Central Offices (CO) for DSL carriers have non-twisted/minimally twisted cable (also known as pulp cable) leaving the CO to feed customers service. With today's current Very High Speed DSL (VDSL) platform, such platform doesn't enable customers to subscribe to IPTV or iTV service over some of the existing cable infrastructure.

DETAILED DESCRIPTION

One embodiment of the present disclosure can entail a method of transmitting interactive TV services using minimally twisted or non-twisted pair cables having a method applied at one or more interface units of receiving a very high digital subscriber line (VDSL) signal at a juncture including the minimally twisted or non-twisted pair cables, and adapting the VDSL signal for transmission over the minimally twisted or non-twisted pair cables to form an adapted VDSL signal.

Another embodiment of the present disclosure can entail computer-readable storage medium having computer instructions at a line card for adapting the VDSL signal for transmission over the minimally twisted or non-twisted pair cables to form an adapted VDSL signal. In another aspect, the adapted VDSL signal can be converted back to the VDSL signal at a minimum speed to enable presentation of interactive television (iTV) services at end user equipment within a premise.

Yet another embodiments of the present disclosure can entail a network device such as a line card (and software therein) to transmit interactive TV services using minimally twisted or non-twisted pair cables having a controller to receive a very high digital subscriber line (VDSL) signal at the minimally twisted or non-twisted pair cable and adapt the VDSL signal for transmission over the minimally twisted or non-twisted pair cable to form an adapted VDSL signal subsequently used for presentation of interactive TV (iTV) services.

Yet another embodiments of the present disclosure can entail a network device (such as a remote card) and software therein to facilitate interactive TV services using minimally twisted or non-twisted pair cables having a controller to receive an adapted very high digital subscriber line (VDSL) signal transmitted over the minimally twisted or non-twisted pair cable and convert the adapted VDSL signal back to a VDSL signal sufficient for an interactive TV (iTV) presentation at end user equipment within a premise.

Figure 1:
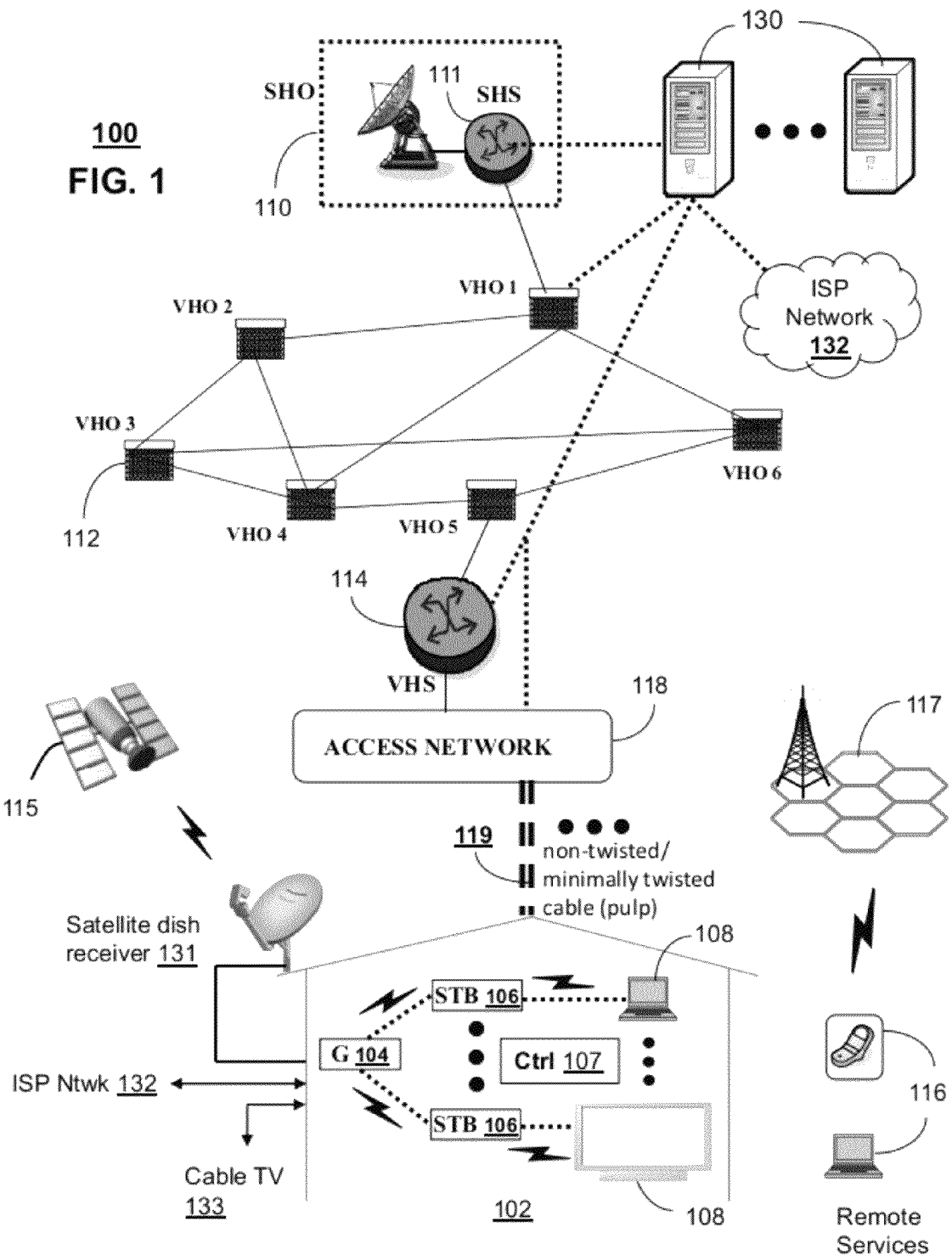
FIG. 1 depicts an illustrative embodiment of a communication system.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over non-twisted or minimally twisted pair cable (commonly referred in the industry as "pulp" cable) 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services including any type of cable services where non-twisted or minimally twisted (pulp) cable is at least partially used in delivering electronic media content.

Figure 2:
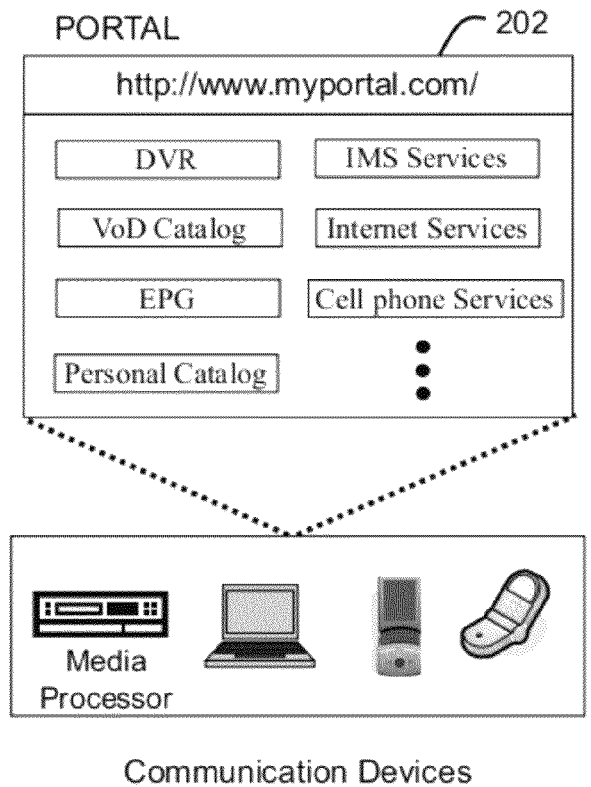
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
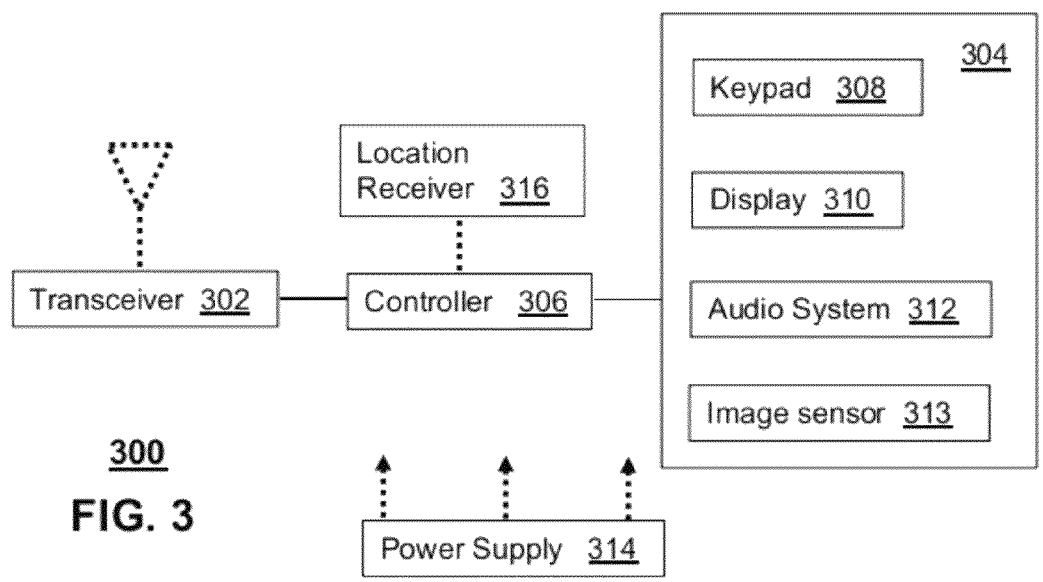
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 412 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 56 of FIG. 1. It will be appreciated that the communication device 300 can also represent other common devices that can operate in communication systems 100 of FIG. 1 such as a gaming console and a media player.

Figure 4:
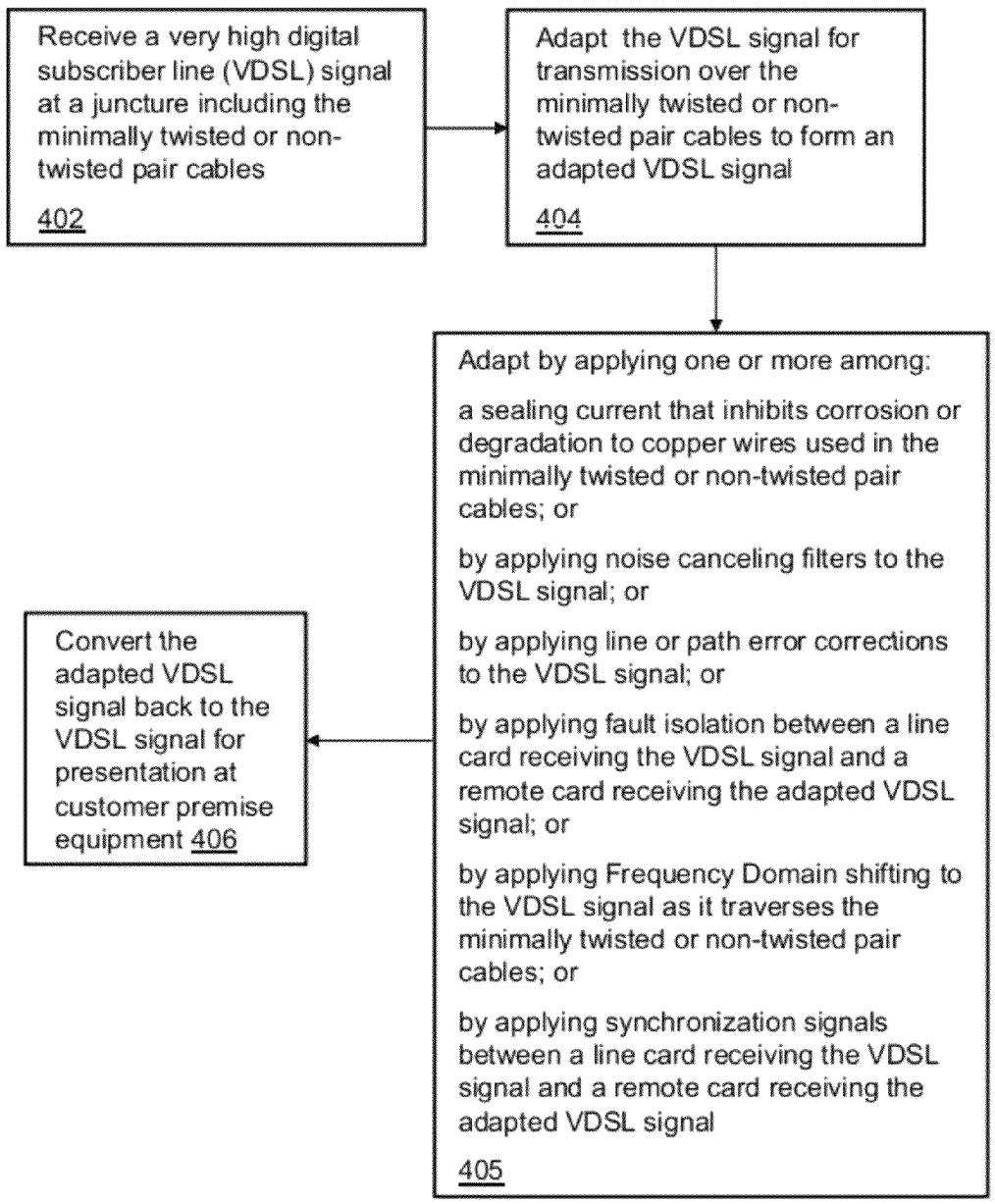
FIG. 4 depicts an illustrative embodiment of a method operating in portions of the communication system of FIG. 1.

FIG. 4 depicts an illustrative method 400 that operates in portions of the communication system of FIG. 1. Method 400 of transmitting interactive TV services using minimally twisted or non-twisted pair cables can begin with step 402 in which the method can receive a very high digital subscriber line (VDSL) signal at a juncture including the minimally twisted or non-twisted pair cables, adapt at 404 the VDSL signal for transmission over the minimally twisted or non-twisted pair cables to form an adapted VDSL signal and convert at 406 the adapted VDSL signal back to the VDSL signal for presentation at end user equipment within a premise. The VDSL signal can be adapted in a number of ways in order to make the VDSL suitable for presentation as part of an iTV or IPTV service. The VDSL signal can be adapted at 405 by applying any number of the adaptation including one or more among adapting by applying a sealing current that inhibits corrosion or degradation to copper wires used in the minimally twisted or non-twisted pair cables or by applying noise canceling filters to the VDSL signal or by applying line or path error corrections to the VDSL signal for high bandwidth, high speed signals or by applying fault isolation between a line card receiving the VDSL signal and a remote card receiving the adapted VDSL signal to help identify locations of a fault. The VDSL signal can also alternatively or optionally be adapted by applying Frequency Domain shifting to the VDSL signal as it traverses the minimally twisted or non-twisted pair cables or by applying synchronization signals between a line card receiving the VDSL signal and a remote card receiving the adapted VDSL signal. The VDSL signal should be adapted for transmission over the minimally twisted or non-twisted pair cables at transmission speed sufficient to deliver the interactive television service or IPTV service which currently should approximately be at least 25 Megabits per second.

Upon reviewing the aforementioned embodiments, it would be evident to an artisan with ordinary skill in the art that said embodiments can be modified, reduced, or enhanced without departing from the scope and spirit of the claims described below. For example, if signals even higher than VDSL become available and further adaptation is required over the minimally twisted or non-twisted cable, it is contemplated that a line card and remote card would provide comparable adaptations to enable continued productive use of such legacy cabling sufficient to provide presentation of iTV or IPTV services.

Other suitable modifications can be applied to the present disclosure without departing from the scope of the claims below. Accordingly, the reader is directed to the claims section for a fuller understanding of the breadth and scope of the present disclosure.

Figure 5:
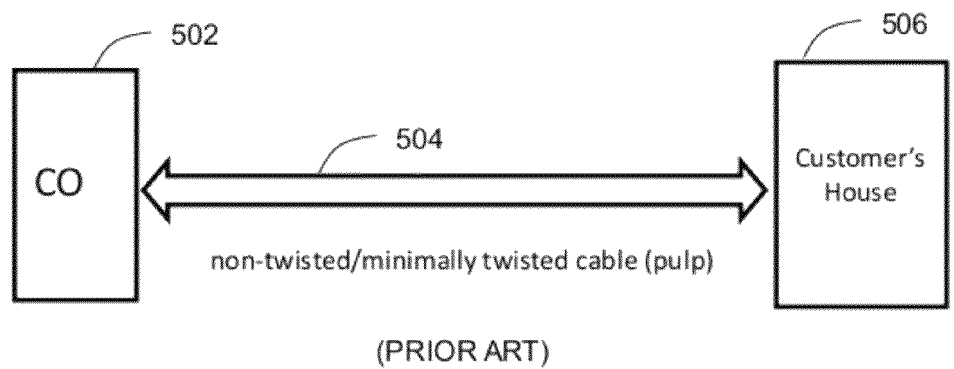
FIG. 5 depicts an illustrative embodiment of an existing arrangement using minimally twisted or non-twisted cables.
Figure 6:
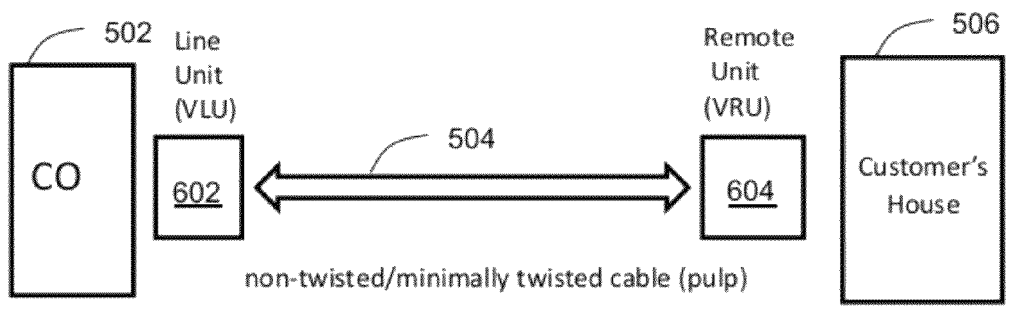
FIG. 6 depicts an illustrative embodiment of an arrangement using minimally twisted or non-twisted cables in accordance with the embodiments herein.

FIG. 5 illustrates the existing configuration 500 that fails to enable the use of non-twisted or minimally twisted cable 504 for use with VDSL type services such as IPTV that can be otherwise be provided from a Central Office 502 to a customer's premise 506 when using the appropriate cabling. FIG. 6 illustrates an embodiment that enables a way to offer IPTV (such as AT&T's Uverse service) over non-twisted/minimally twisted cable (pulp cable) 504. Currently, IPTV service can not be offered to customers that are fed from the Central Office 502 on non-twisted/minimally twisted cable. Only customers that are fed by fiber/remote terminals or twisted cable can use this service. With the creation of a VDSL platform in a system 600 as shown in FIG. 6 and utilizing a line unit 602 and remote unit 604 as shown, service can be offered to additional customers notwithstanding the cable configuration they may have which may include the non-twisted or minimally twisted cable 504. This solution enables a carrier to provide the latest high speed services without great expenditure in deploying fiber and expensive equipment to the field. The Line unit (VLU) 602 and Remote unit (VRU) 604 would provide synchronization between the two cards, similar to the current HDSL technology.

Figure 7:
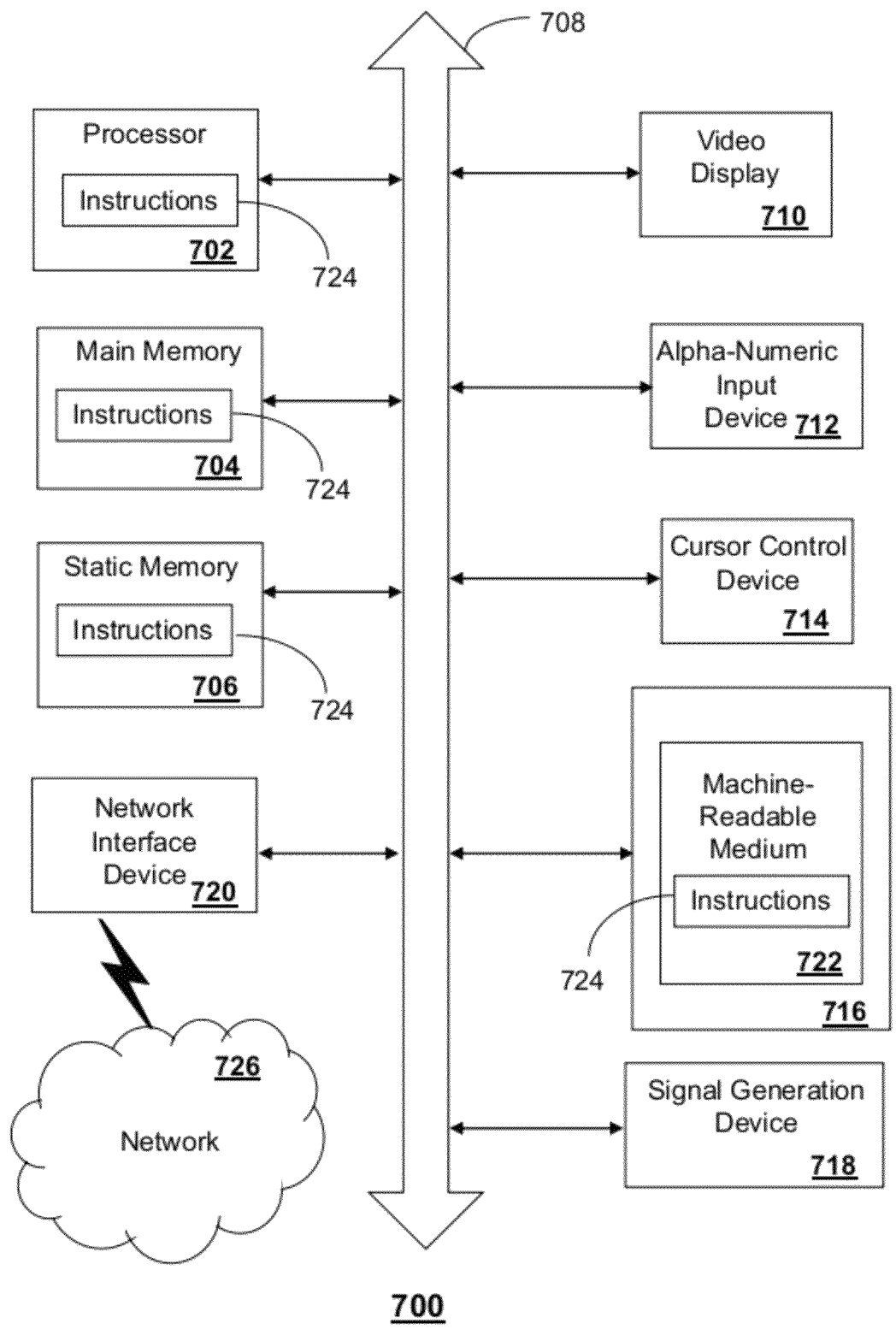
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a first line card coupled to minimally twisted or non-twisted pair cables, a signal, wherein the minimally twisted or non-twisted pair cables have a transmission deficiency which prevents reliable delivery of the signal at a desired signal quality for presenting interactive television services at customer premise equipment, wherein the signal comprises a very high digital subscriber line signal;
   modifying the signal, by applying noise canceling filters to the signal by the first line card, for transmission over the minimally twisted or non-twisted pair cables to generate an updated signal that overcomes the transmission deficiency, wherein the updated signal comprises a very high digital subscriber line signal; and
   transmitting from the first line card the updated signal to a second line card to cause the second line card to receive the updated signal at the desired signal quality and convert the updated signal to a converted signal for presentation of the interactive television services at the customer premise equipment, wherein the converted signal comprises a very high digital subscriber line signal.

2. The method of claim 1, wherein the modifying of the signal does not include applying a sealing current to the signal.

3. The method of claim 1, wherein the signal is modified by applying line or path error corrections to the signal.

4. The method of claim 1, comprising identifying a location of a fault between the first line card and the second line card by utilizing fault isolation.

5. The method of claim 1, wherein the signal is modified by applying synchronization signals to the signal between the first line card and the second line card.

6. The method of claim 1, wherein the signal is modified for transmission over the minimally twisted or non-twisted pair cables by applying a sealing current to the signal.

7. A method, comprising receiving, by a second line card from a first line card over a minimally twisted or non-twisted pair cable, an updated signal transmitted over the minimally twisted or non-twisted pair cable, wherein the updated signal is provided by the first line card by modifying an original signal by applying a noise cancelling filter to the signal to generate the updated signal, wherein the original signal comprises a very high digital subscriber line signal, and wherein the updated signal overcomes a transmission deficiency which prevents reliable receipt of the signal at a preferred signal quality for presenting interactive television services at customer premise equipment, wherein the updated signal comprises a very high digital subscriber line signal; and converting, by the second line card, the updated signal back to the original signal for enabling the customer premise equipment to receive the interactive television services: wherein the converted signal comprises a very high digital subscriber line signal.

8. The method of claim 7, wherein the first line card applies a line or path error correction to the signal.

9. The method of claim 7, wherein the converting by the second line card comprises converting the updated signal back to the original signal to support a preferred data communication speed.

10. The method of claim 7, wherein the converting the updated signal back to the original signal comprises synchronization by the second line card with the first line card.

11. A system to transmit and receive interactive television services using minimally twisted or non-twisted pair cables, comprising:
   a first line card coupled to the minimally twisted or non-twisted pair cable, the first line card comprising:
      a first memory comprising first instructions; and
      a first processor coupled to the first memory, wherein responsive to executing the instructions, the first processor performs first operations comprising:
         receiving a signal; and
         modifying the signal for transmission over the minimally twisted or non-twisted pair cable having a transmission characteristic which affects a preferred signal quality for presenting interactive television services at customer premise equipment, wherein the signal is modified to form an updated signal that overcomes the transmission characteristic; and
   a second line card coupled to the minimally twisted or non-twisted pair cable, the second line card comprising:
      a second memory comprising second instructions; and
      a second processor coupled to the second memory, wherein responsive to executing the second instructions, the second processor performs second operations comprising converting the updated signal to a converted signal enabling the customer premise equipment to present the interactive television services,
   wherein the signal comprises a very high digital subscriber line signal,
   wherein the updated signal comprises a very high digital subscriber line signal, and
   wherein the converted signal comprises a very high digital subscriber line signal.

12. The system of claim 11, wherein the first operations further comprise transmitting, from the first line card, the updated signal to the second line card enabling the second line card to receive the updated signal at the preferred signal quality.

13. The system of claim 11, wherein the first operations further comprise generating the updated signal by applying to the signal a sealing current that inhibits degradation to the minimally twisted or non-twisted pair cables.

14. The system of claim 11, wherein the first operations further comprise transmitting synchronization signals to the second line card.

* * * * *